(12) United States Patent
Dewispelaere et al.

(10) Patent No.: US 7,645,125 B2
(45) Date of Patent: Jan. 12, 2010

(54) REFRIGERANT COMPRESSOR WITH IMPROVED OIL RETENTION

(75) Inventors: Bradley Joseph Dewispelaere, Lockport, NY (US); Ronald W Williams, Casa Grande, AZ (US)

(73) Assignee: Delphi Technologies, Inc., Troy, MI (US)

( * ) Notice: Subject to any disclaimer, the term of this patent is extended or adjusted under 35 U.S.C. 154(b) by 530 days.

(21) Appl. No.: 10/874,046

(22) Filed: Jun. 22, 2004

(65) Prior Publication Data
US 2005/0281686 A1  Dec. 22, 2005

(51) Int. Cl.
*F04B 1/26* (2006.01)

(52) U.S. Cl. .................. 417/222.2; 417/53; 417/269; 417/366; 62/133; 62/228.5

(58) Field of Classification Search .............. 417/222.2, 417/269, 53, 366; 62/133, 262, 228.5
See application file for complete search history.

(56) References Cited

U.S. PATENT DOCUMENTS

| | | | |
|---|---|---|---|
| 2,093,295 A | 9/1937 | Teeter | 230/191 |
| 2,926,894 A * | 3/1960 | Price | 261/37 |
| 3,473,730 A | 10/1969 | Cheney et al. | 230/206 |
| 3,838,942 A | 10/1974 | Pokorny | |
| 5,026,316 A * | 6/1991 | Kurosawa et al. | 417/222.2 |
| 5,189,886 A | 3/1993 | Terauchi | |
| 6,129,519 A | 10/2000 | Ogura | 417/222.2 |
| 6,213,728 B1 * | 4/2001 | Kato et al. | 417/222.2 |
| 6,352,416 B1 * | 3/2002 | Ota et al. | 417/222.2 |
| 6,568,920 B2 | 5/2003 | Yttri et al. | 417/312 |
| 6,572,341 B2 * | 6/2003 | Kimura et al. | 417/213 |
| 6,575,708 B2 | 6/2003 | DeWispelaere | 417/269 |
| 2005/0145232 A1 * | 7/2005 | White et al. | 123/572 |
| 2005/0155560 A1 * | 7/2005 | Bauer et al. | 123/41.35 |

FOREIGN PATENT DOCUMENTS

EP   1293670   3/2003

OTHER PUBLICATIONS

European Search Report for EP 05076335.

* cited by examiner

*Primary Examiner*—Frantz F Jules
*Assistant Examiner*—Azim Rahim
(74) *Attorney, Agent, or Firm*—Patrick M. Griffin

(57) ABSTRACT

A variable capacity automotive refrigerant compressor is provided with a pressure equalization passage between the crankcase volume and the suction passage in the manifold to prevent a pressure imbalance between the two that could otherwise cause a reduction in crankcase lubricant retention during extended periods of system inactivity.

1 Claim, 4 Drawing Sheets

REFRIGERANT COMPRESSOR WITH IMPROVED OIL RETENTION

TECHNICAL FIELD

This invention relates to a refrigerant compressor with improved oil retention.

BACKGROUND OF THE INVENTION

Automotive air conditioning systems typically include a front mounted refrigerant condenser, an underhood refrigerant compressor, and an evaporator contained in an HVAC housing that is essentially inside the passenger compartment. The main inner volume of the compressor, the so called crankcase, is substantially hollow, but numerous moving components are either contained in it, or exposed to it, such as the central drive shaft (and support bearings), swash plate, and reciprocating pistons. During operation, refrigerant vapor running through the system (and the compressor) carries entrained oil, which reaches and lubricates the various moving part interfaces. When the compressor sits for extended periods of non operation, it is desirable that a substantial pool of lubricant remain at the bottom of the crankcase, to be available to lubricate the interfaces during start up.

Observation made prior to the subject invention found that, surprisingly, lubricant appeared to be actively leaving the compressor crankcase during periods of vehicle and compressor inactivity, and moving to the condenser, where it would not be immediately available at compressor start up. This appeared to be an incremental, rather than a precipitous process, but was still a concern, and the cause was not readily apparent. Detailed analysis found an explanation for this phenomenon, which was a pressure imbalance between the main crankcase volume of the compressor, and the suction cavity in the adjacent manifold. This imbalance was creating a condition by which liquid refrigerant and lubricant, which is miscible in the refrigerant, was subject to a combination of internal siphoning and pushing forces that pushed and pulled the liquid out of the compressor. Although the problem was better understood, a solution was not immediately apparent.

SUMMARY OF THE INVENTION

The subject invention provides a solution to the problem analyzed above comprising a means to equalize and reduce the pressure differential that initiates the liquid refrigerant-lubricant migration. A small pressure equalization passage is provided at a high point within the compressor, between the crankcase and suction chamber in the manifold. This reduces the tendency of the liquid refrigerant-oil mixture to be pulled and or pushed out of the crankcase and into the manifold, which could otherwise ultimately result in the migration described above. The size of the equalization hole is small enough to not significantly affect ordinary compressor operation.

DESCRIPTION OF THE PREFERRED EMBODIMENT

Figure 1:
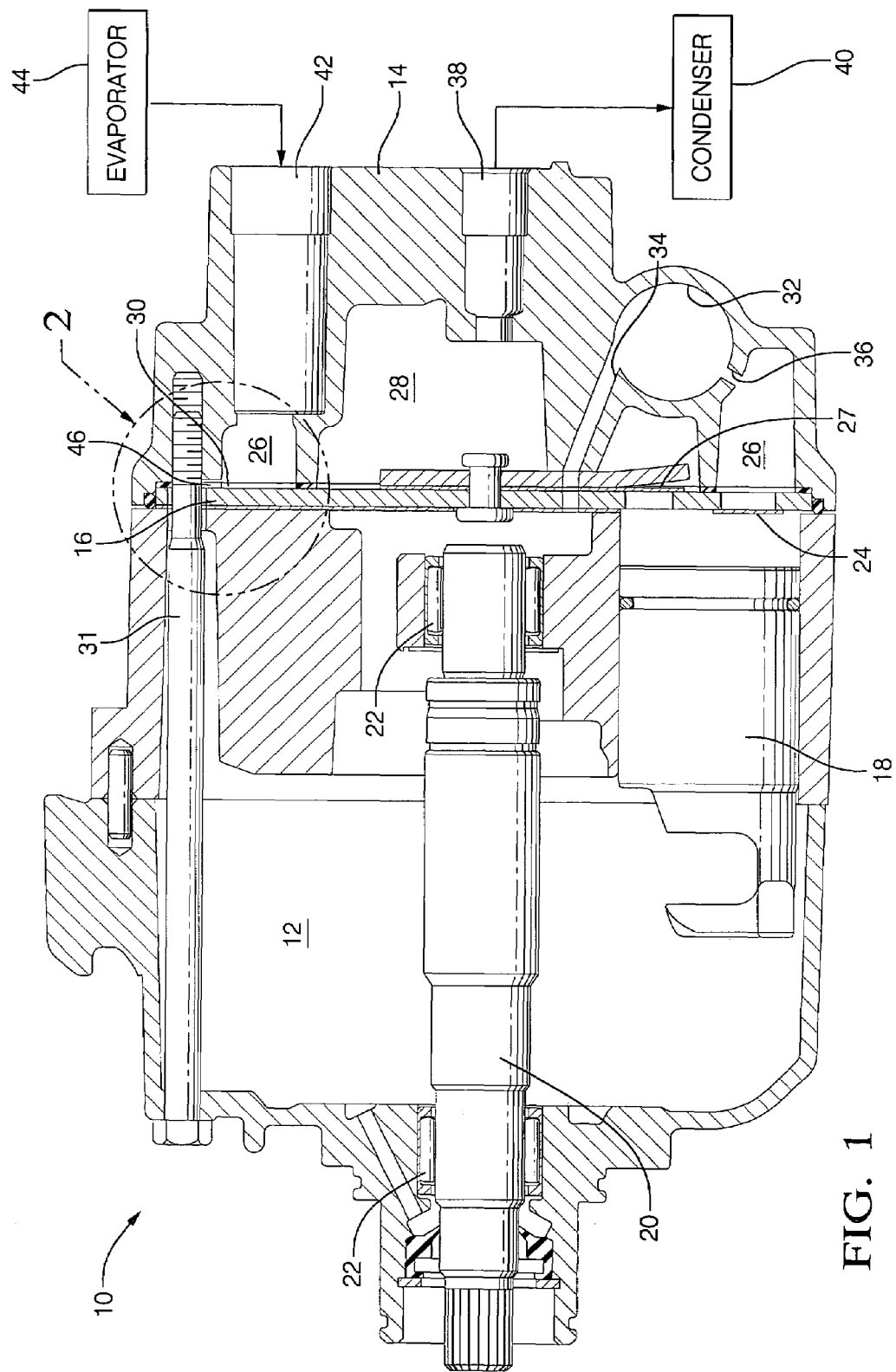
FIG. 1 is a cross sectional view of a compressor of the type described above, showing the various volumes or spaces within, and showing the general location of an evaporator and a condenser schematically.

Referring first to FIG. 1, a standard variable capacity compressor has almost identical features to compressor 10, which is modified, according to the invention, as indicated below. Typical features of compressor 10 include a relatively massive main compressor body, basically a horizontal cylinder, with an internal crankcase 12 adjacent to a refrigerant manifold 14, the two separated by a valve plate 16. Most of the moving parts of compressor 10 are contained within crankcase 12, including reciprocating pistons 18 (moved by a non illustrated swash plate), drive shaft 20, and drive shaft support bearings 22. Valve plate 16 supports one way suction reed valves 24 that pass refrigerant vapor from a manifold suction chamber 26 to the pistons 18, and opposed one way discharge reed valves 27 that pass compressed refrigerant vapor from pistons 18 into a manifold discharge chamber 28. Both the suction chamber 26 and discharge chamber 28 are convoluted spaces, but the suction chamber is basically radially outboard relative to the manifold 14, and the discharge chamber 28 central, with each kept sealed from the other by a sealing gasket 30, clamped tightly between the outside of valve plate 16 and the inside of manifold 14. Several conventional through bolts 31 that clamp head 14 in place necessarily pass through valve plate 16 and gasket 30, a factor that is significant later in the description. Near the bottom or "6 o'clock" position of manifold 14, a control valve cavity 32 contains a non illustrated control valve which provides for selective communication of vapor pressure between suction chamber 26 and the crankcase 12, so as to adjust a relative pressure balance between the vapor pressures acting on the front and rear of the pistons 18, thereby controlling their stroke. What is significant here is not the operation of the control valve per se, but rather the fact that it is located at a low point relative to the crankcase 12, and also that manifold 14 includes both a crankcase to valve cavity passage 34 and a valve suction chamber to valve cavity bleed orifice 36 that allow the refrigerant vapor flows necessary to the operation of the compressor 10. The centrally located discharge chamber 28 has a discharge port 38, which, significantly, is located above the valve cavity 32. Discharge port 38 is connected by conventional refrigerant lines to a condenser, indicated schematically at 40, which is mounted behind the vehicle grill, generally lower than the outlet port 38. Condenser 40 is exposed to lower directed, morning sun rays, but more shielded later in the day, and is relatively light weight, so that it both cools and warms relatively rapidly. In addition, the suction chamber 26 has an inlet port 42, located generally above discharge port 38, and connected by refrigerant lines to an evaporator, indicated schematically at 44. Evaporator 44 is located typically inside an HVAC housing that is at least partially inside the vehicle cabin, is exposed to the same greenhouse effect solar warming, and also capable or relatively rapid warming. The relative location and inherent characteristics of these three main components, compressor 10, condenser 40, and evaporator 44, as well as the internal structures of compressor 10, were found to contribute to the previously unappreciated lubricant migration phenomenon noted above. Lubricant that migrates to and is temporarily retained in the condenser 40 is not available at compressor start up, and will not re enter the system and the compressor fully until the system has been running for a time.

As a consequence, a larger system charge of lubricant is required than would otherwise be necessary if the crankcase retention of lubricant during prolonged periods of system inactivity could be somehow improved. An obvious solution is the addition of a check valve in the refrigerant line between the discharge port 38 and the condenser 40. This would add cost and pressure drop to the system, however.

Figure 2:
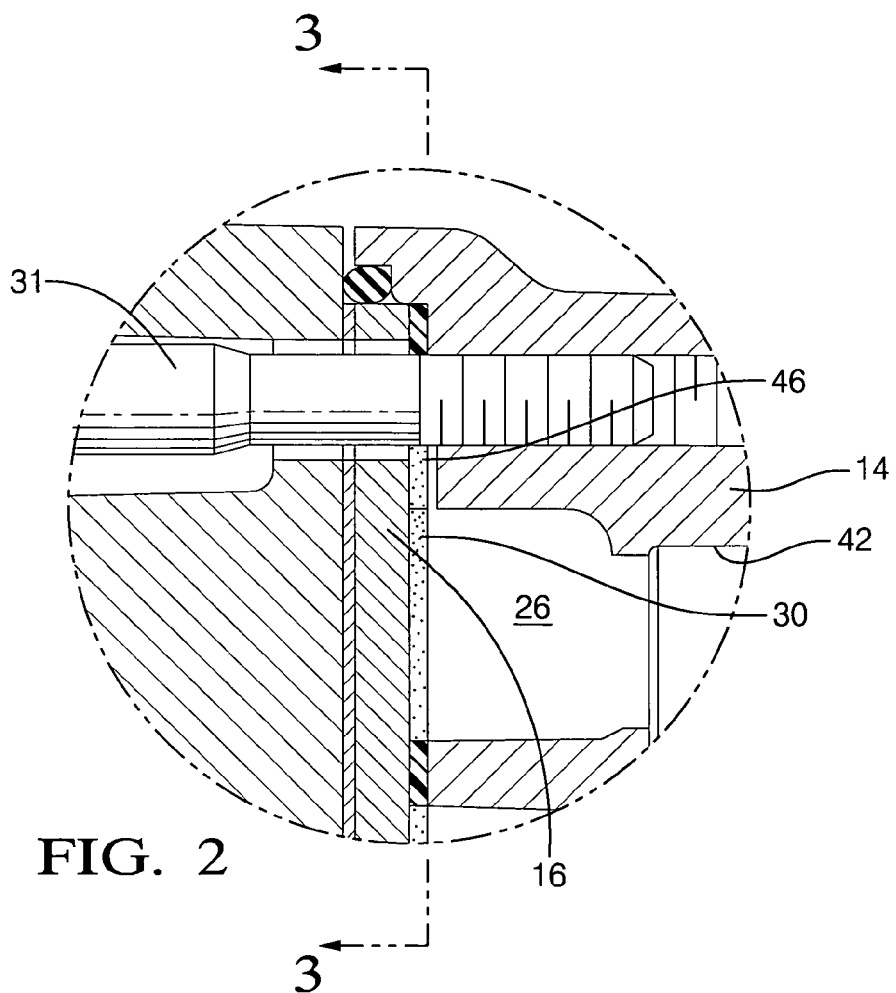
FIG. 2 shows an enlarged view of a circled section of FIG. 1.
Figure 3:
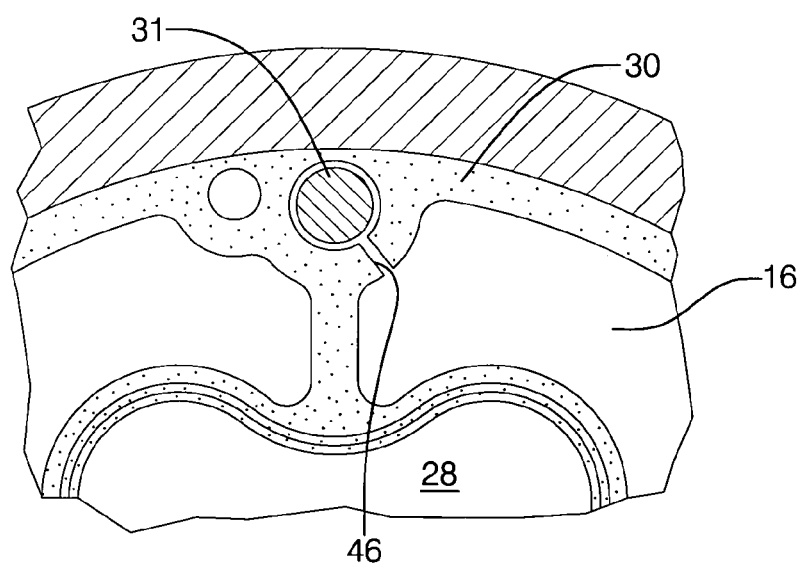
FIG. 3 shows a sectional view taken along the plane indicated by line 3-3 in FIG. 2.

Referring next to FIGS. 2 and 3 the invention provides a more elegant and less costly solution to the problem, a solution that is, in fact, cost free as disclosed. The sealing gasket 30 referred to above has a simple notch 46 molded into it at the high point where the upper through bolt 31 passes through it. The operation of notch 46 is described next.

Figure 4:
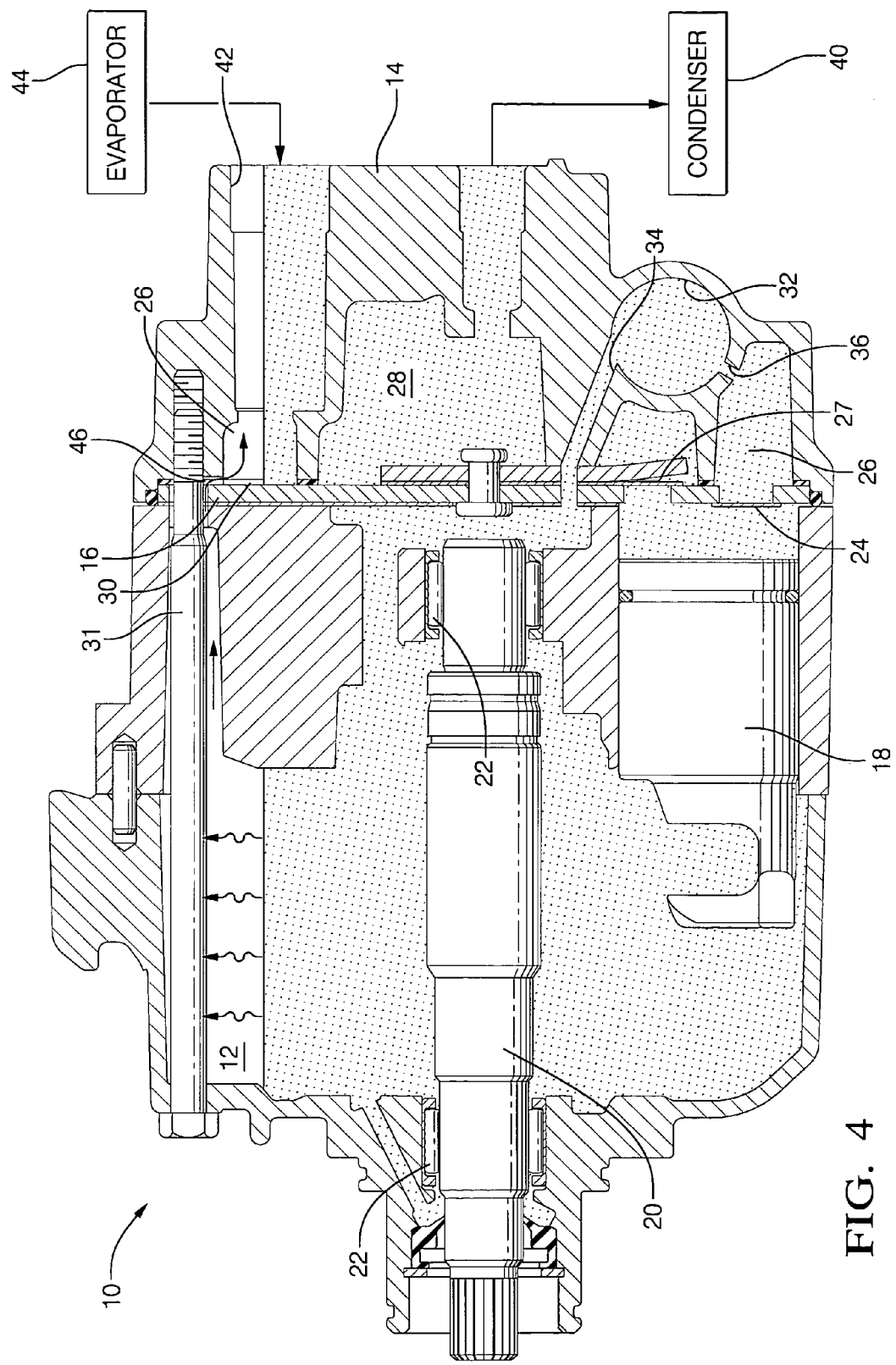
FIG. 4 shows the compressor during an extended period of system activity, at a point in the mid afternoon.

Referring next to FIG. 4, the compressor is shown at a point in the mid afternoon, during a period of prolonged system inactivity, such as might occur when the vehicle sits in a parking lot for several days consecutively. With gasket 30 having been provided with the notch 46 as described above, a small vapor flow passage is thereby created at a high point within crankcase 12 into suction chamber 26. Being at a high point, vapor will reach it, but liquid will not, unlike the passages 34 and 36 at the lower location. Consequently, a pressure differential does not develop between crankcase 12 and suction chamber 14 to drive outflow of liquid from crankcase 12 into manifold 14. Instead, vapor is able to equalize between the two, and the liquid level remains the same in crankcase 12 and manifold 14. While the pressure equalization passage provided by gasket notch 46 is small, the process described is relatively slow, so the small passage is more than large enough to allow pressures to equalize, but still small enough not to effect compressor operation later. It provides a significant "slow leak" of pressure, but an insignificant "fast leak."

Figure 5:
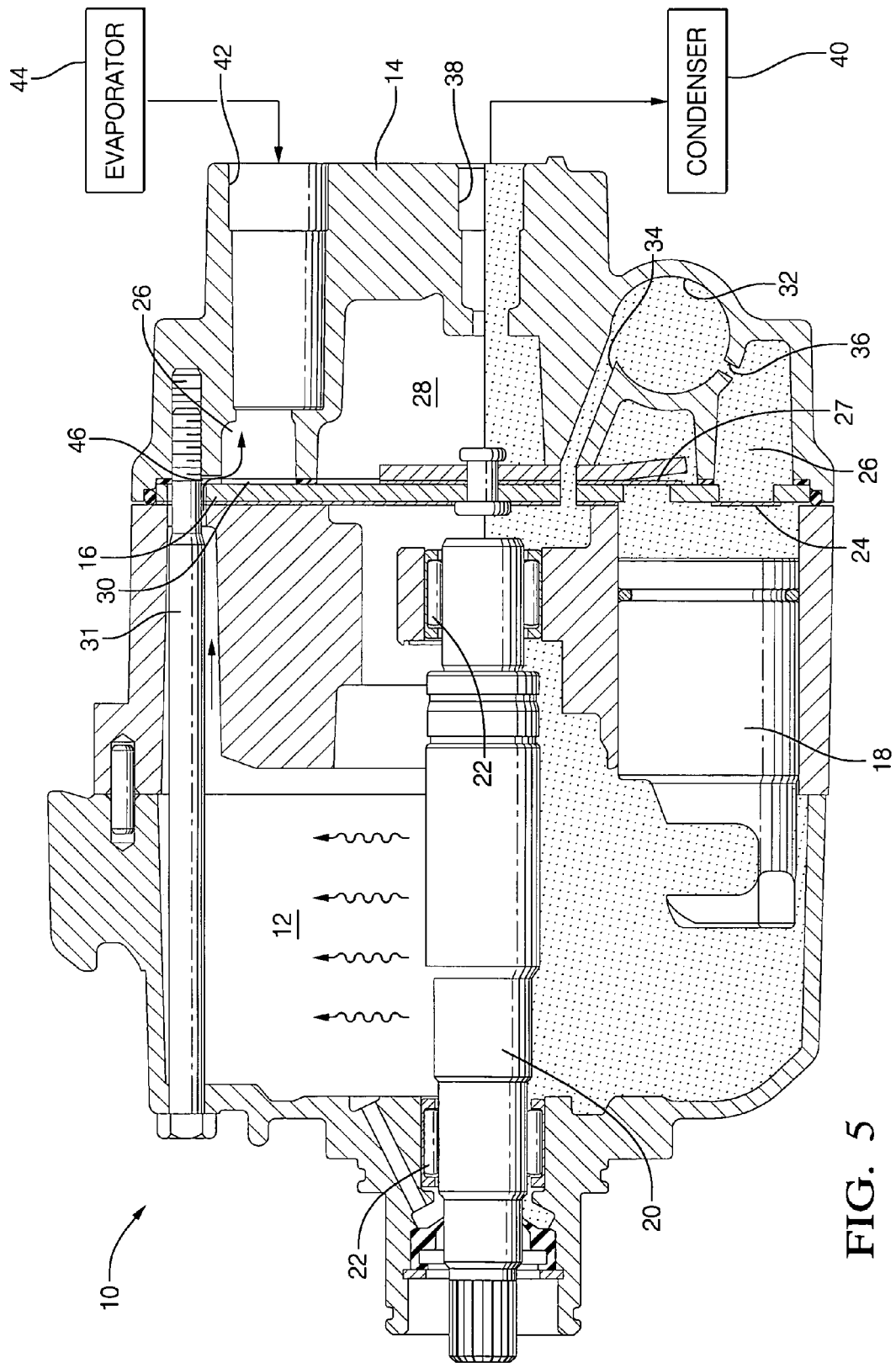
FIG. 5 shows the same compressor at a point late in the afternoon.

Referring next to FIG. 5, the same compressor 10 is illustrated at a point later in the afternoon. Again, the level of liquid in crankcase 12 and manifold 14 remain the same, due to the equalization of pressure allowed between the two. Refrigerant vapor has flowed out of the compressor 10 to condense in the relatively cooler condenser 40. In addition, some drainage of liquid out of discharge chamber 28, through discharge port 38 into the system line to condenser 40 is lower and runs "downhill," in effect. But what has not occurred is the more serious, pressure differential driven migration action described above, so the retention of oil in crankcase 12 is much improved. For example, one test showed the oil retained over a 15 day period of system activity to have been improved dramatically, from essentially none to approximately 28 milliliters. As noted, this is an improvement in retention that allows the initial lubricant charge to be minimized.

Once the analysis of the previously unappreciated, and fairly complex, oil migration process was complete, the improvement described above was devised, as an alternative to the obvious expedient of a check valve. Unlike the check valve, it deals more with the root cause than with the result of the problem, alleviating the pressure differential, rather than blocking its action, as a simple check valve would do. Other means of providing the pressure equalization passage could be provided, such as a dedicated, drilled hole, so long as it was at a similar location, high within the compressor 10, at a point where vapor is seen, but liquid is not. Therefore, it will be understood that it is not intended to limit the invention to just the embodiment disclosed.

The invention claimed is:

1. In an air conditioning system having a compressor and a condenser, and in which the compressor has a crankcase oriented relative to an adjacent refrigerant manifold such that a condenser connected discharge port in said manifold is located higher than a one way flow path out of said crankcase and into said manifold, so that, when the compressor is hotter than said condenser, higher pressure refrigerant vapor in said crankcase can push liquid refrigerant and oil out of said crankcase and high enough into said refrigerant manifold to reach said discharge port and flow to said condenser, the improvement comprising, a pressure equalization passage directly connecting said crankcase to the refrigerant manifold, located at a point above said one-way flow path, thereby allowing the refrigerant vapor pressure from the crankcase to equalize relative to the pressure in said refrigerant manifold, so as to prevent the pressure differential that would otherwise enable the loss of lubricant from the crankcase, wherein said pressure equalization passage maintains continuous communication of said refrigerant vapor between said crankcase and said manifold when the compressor is in a state of inactivity, wherein said compressor further comprises:

a sealing gasket positioned between said crankcase and said manifold, wherein said sealing gasket defines a bolt clearance having a notch located at a point above said one way flow path, a bolt through hole having an inner diameter aligned with said bolt clearance, wherein said bolt through hole is in hydraulic communication with said crankcase and said refrigerant manifold, a bolt having a bolt diameter less than said inner diameter of said bolt through hole, wherein said bolt passes through said bolt hole and said bolt clearance of said gasket;

wherein said notch and space between said bolt diameter and said bolt hole inner diameter defines said pressure equalization passage.

* * * * *